US008879514B2

(12) United States Patent
Sambhwani et al.

(10) Patent No.: US 8,879,514 B2
(45) Date of Patent: Nov. 4, 2014

(54) APPARATUS AND METHOD FOR DETECTION OF A DEDICATED CONTROL CHANNEL (DCCH)

(75) Inventors: Sharad Deepak Sambhwani, San Diego, CA (US); Sony J. Akkarakaran, Poway, CA (US); Nitin Kasturi, Saratoga, CA (US); Shashank V. Maiya, Santa Clara, CA (US); Wei Zhang, Santa Clara, CA (US); Prashant Udupa Sripathi, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 13/619,157

(22) Filed: Sep. 14, 2012

(65) Prior Publication Data

US 2014/0078909 A1   Mar. 20, 2014

(51) Int. Cl.
*H04B 7/216* (2006.01)
*H04W 52/02* (2009.01)

(52) U.S. Cl.
CPC .................. *H04W 52/0238* (2013.01)
USPC .......................................... 370/335

(58) Field of Classification Search
USPC ......... 370/203, 204–215, 229–240, 310–394, 370/395.1, 395.3, 395.4, 395.41, 395.42, 370/395.5, 395.52, 431–529, 523–520
See application file for complete search history.

(56) References Cited

U.S. PATENT DOCUMENTS

| 5,784,392 | A   * | 7/1998  | Czaja et al. ................... 714/786 |
| 7,107,514 | B1  * | 9/2006  | Oberg et al. ................... 714/795 |
| 7,688,915 | B2    | 3/2010  | Tanrikulu et al.                          |
| 7,929,473 | B2  * | 4/2011  | Willenegger et al. ......... 370/310      |
| 2003/0128744 | A1 * | 7/2003  | Yeo et al. ...................... 375/147  |
| 2008/0075046 | A1 * | 3/2008  | Dominique et al. .......... 370/335       |
| 2009/0122891 | A1   | 5/2009  | Bottero et al.                            |
| 2009/0318199 | A1   | 12/2009 | Barreto et al.                            |
| 2010/0260231 | A1   | 10/2010 | Ringstom et al.                           |
| 2011/0038342 | A1   | 2/2011  | Lindskog et al.                           |
| 2012/0044870 | A1 * | 2/2012  | Mochizuki et al. ........... 370/328      |

OTHER PUBLICATIONS

International Search Report and Written Opinion—PCT/US2013/025477—ISA/EPO—Jul. 30, 2013.
Partial International Search Report—PCT/US2013/025477—ISA/EPO—May 24, 2013.

* cited by examiner

*Primary Examiner* — Jung-Jen Liu

(57) ABSTRACT

Apparatus and methods for wireless communication that includes measuring energy on a first path metric and second path metric, comparing the energy on the first path metric and second path metric to a predetermined threshold and determining if Dedicated Control Channel (DCCH) energy is present.

10 Claims, 11 Drawing Sheets

APPARATUS AND METHOD FOR DETECTION OF A DEDICATED CONTROL CHANNEL (DCCH)

FIELD

Aspects of the present disclosure relate generally to wireless communication systems, and more particularly, to an apparatus and method for detecting a Dedicated Control channel (DCCH).

BACKGROUND

With the advent of modern mobile wireless communication, reducing the power consumption by a receiver in a mobile device is essential in increasing the battery life of the mobile device. One scheme for reducing receiver power consumption involves decoding transmission packets before they have been completely received and powering down the receiver from the time of successful decoding until the end of the packet transmission. However, when multiple packets are simultaneously transmitted, the receiver can only be powered down when all of the packets have been successfully decoded prior to their complete reception. In some situations, when the exact number of packets transmitted is not known to the receiver, all possible decoding hypotheses of the possible number of packets is performed for detecting the exact number of transmission packets. In these cases, if some transmission packets successfully decoded early but some are not, a decision must be made as to whether the early decode failures were due to the fact that the corresponding transmission packet was not transmitted or because the receiver has not yet received a long enough portion of the transmission packet for successfully decoding. In the former situation, the receiver can be powered down early but in the later situation, powering down the receiver would lead to varying unintended consequences. As a result, an incorrect decision to shut down the receiver will result in loss of some packets, while an incorrect decision to keep the receiver on results in a lost opportunity to reduce receiver power consumption. Since transmission packet loss causes severe consequences, successful implementation of receiver shut down requires a good detector that minimizes the probability of false-alarms (detection of packet transmission when no packet was transmitted).

In the context of WCDMA R99 downlink, frequent transmissions of data packets on a Dedicated Transport Channel (DTCH) occur concurrently with sporadic transmission of control packets on a Dedicated Control Channel (DCCH). With blind transport format detection (BTFD), the user equipment's (UE) receiver does not know in advance whether the DCCH is being transmitted at any given time. Upon early decoding of the DTCH, the receiver must then decide whether or not a DCCH packet was being transmitted at that time before it can power down. Such a decision is required even outside the context of early decoding in order to determine the power-control outer-loop signal-to-noise (SNR) target adjustment. In other words, the SNR target must be raised if a DCCH packet was transmitted and failed to decode, but it must not be raised if the decode failure was simply due to absence of packet transmission.

Thus, aspects of this invention provide an apparatus and method for improving the power consumption of a UE upon detection of a DCCH transmission packet.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In fixed-positions rate-matching, the receiver measures the energy of the received modulation symbols by averaging over the DCCH packet transmission interval or a subset of this interval. This measured energy will thus have very different statistics depending on whether or not a DCCH transmission packet was actually transmitted. This difference can be exploited to determine whether DCCH transmission packets were transmitted or not.

In other words, when there is no DCCH packet transmission in fixed-positions rate-matching, the transmission modulation symbols normally used to carry DCCH bits when a DCCH packet is transmitted are DTXed (i.e., transmitted with zero power). By exploiting this zeroing out of the DCCH transmission modulation symbols, aspects of this invention may be configured to whether DCCH transmission packets were transmitted.

Even when DCCH transmission packets are not transmitted, the energy measured as described above will still be nonzero, due to noise. Thus one approach in determining the existence of DCCH transmission packets could be to declare DCCH to be detected whenever the measured energy exceeds the noise level by a certain threshold. However, this requires building an appropriate noise level estimator and determining a threshold value that works for a range of propagation channel models and receiver geometries. This approach becomes cost-prohibitive.

Hence, another approach is to use the energy of the received DPCCH bits as a reference instead of a noise level. Since these bits can be subject to the same processing as the DCCH bits in the receiver's demodulator, a separate reference level estimator is unnecessary. Determining the threshold for this approach would work robustly across a range of geometries and channel models. Indeed, aspects of this invention provide methods and apparatus for determining the appropriate threshold.

Figure 1:
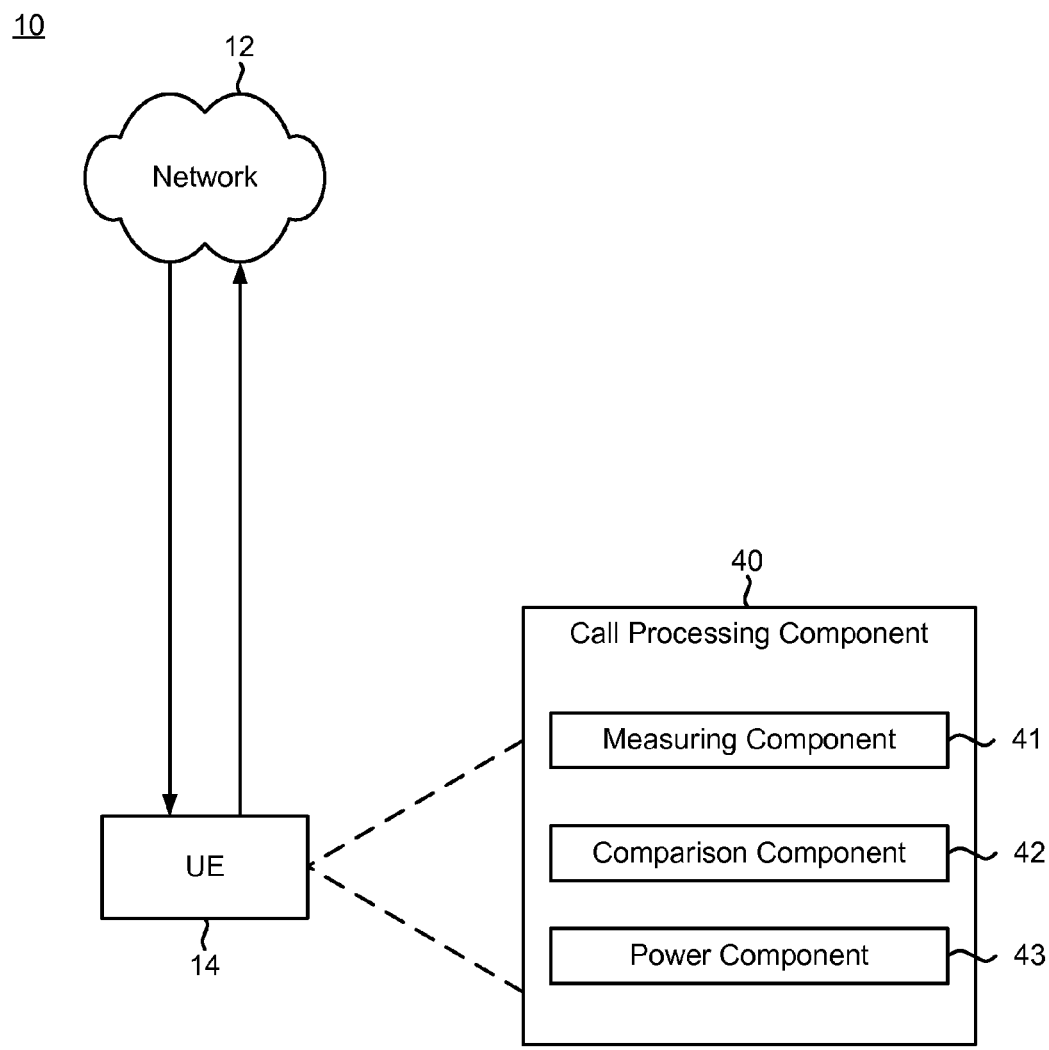
FIG. 1 is a schematic diagram illustrating exemplary aspect of processing calls in a wireless communication system.

FIG. 1 discloses a wireless communication system 10 configured to include wireless communications between wireless network 12 and UE 14. The wireless communication system 10 may be configured to support communications between a number of users. The wireless communication system 10 can be configured for downlink message transmission or uplink message transmission, as represented by the up/down arrows between wireless network 12 and UE 14.

In an aspect, within the UE 14 resides a call processing component 40. The call processing component 40 may be configured, among other things, to include a measuring component 41 capable of measuring the energy on a plurality of transmission channels or path metrics. In other words, the measuring component 41 measures the energy of the received modulation symbols of different transmission channels. For example, measuring component 41 may be configured to measure the transmission energy of a DCCH packet or a measure the transmission energy of a DCTCH packet.

Additionally, call processing component 40 may be configured to include a comparison component 42 for comparing the ratio of measured energy of a first path relative to the energy of a second path tracked by a Viterbi algorithm (discussed below) to a predetermined threshold. After the comparison component 42 compares the ratio of energy to a threshold, a determination is made as to whether DCCH energy is present. The threshold may be configured to work robustly across a range of channel models.

Last, the call processing component 40 may also be configured with a power component 43 for increasing a power control outer loop target SNR when DCCH energy is present. In other words, the output of the call processing component 40 may be utilized to decide whether to power down the receiver after successful early decoding of DTCH, and whether to raise the power-control outer-loop target SNR setpoint after failure to decode DCCH.

In practical networks, the requirements for DCCH decoding performance are harder to achieve than requirements required for DTCH decoding performance. As such, the output from the call processing component 40 can be used to improve DCCH decoding performance. For instance, the call processing component 40 may be run early (prior to completion of a DCCH transmission packet) and the outer-loop target SNR can be raised if DCCH is detected.

Furthermore, the detection thresholds that are used may be adjustable depending on the required results. For example, to avoid unnecessary raising of outer-loop target SNR, a higher threshold should be utilized. This is especially important in the initial stages of receiving a packet transmission since the threshold used for determining whether the receiver can be powered down off must be conservative. Indeed, the threshold must be kept low in order to meet the miss probability requirements.

Additionally, the DCCH transmission time interval (TTI) could be different from that of DTCH TTI. For example, DTCH could have 20 ms TTI, while DCCH has 40 ms TTI. Consequently, the receiver is forced to wake up (if it has been shut down earlier) at the start of the last 20 ms, to decode the DTCH packet that begins at that time. This gives rise to three options for running the call processing component 40:

(a) The call processing component 40 could be run separately and independently for the first and the last 20 ms of the 40 ms DCCH packet, with a tie-breaker rule (eg, choosing the more recent result) in case the two runs produced contradicting detector outputs.

(b) The call processing component 40 could be run separately for the first and last 20 ms, however, the second run also uses the observations collected from the first run. In this case, the final result will be that of the second run, since it has more observations and is hence expected to be more reliable.

(c) The call processing component 40 could be run only for the first 20 ms, with the result obtained being used for the next 20 ms as well.

Note that method (b) provides the best performance, while method (c) incurs the least complexity.

Thus, the present apparatus and methods include a UE-based call processing component 40 configured to power down a receiver on the UE by determining the existence of DCCH transmission packets.

Figure 2:
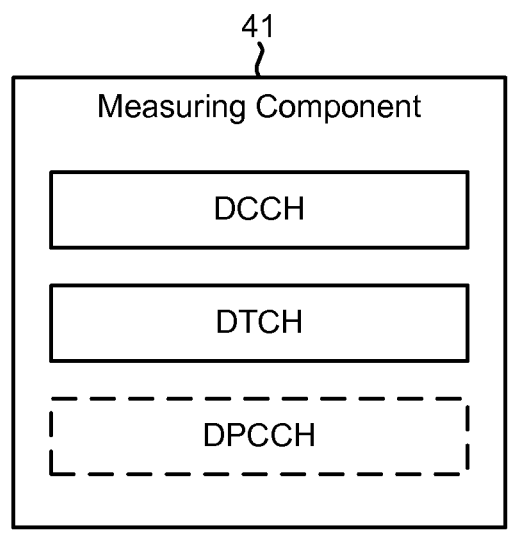
FIG. 2 is a schematic diagram illustrating the functionality and operation of a measuring component residing in a wireless communication system.

FIG. 2 is a schematic diagram further illustrating the functionality and operation of the measuring component 41 that resides in the call processing component 40 (FIG. 1).

In one aspect, measuring component 41 may be invoked to specifically measure the energy on a plurality of path metrics. As stated earlier, the measuring component 41 may be configured to measure the energy on the DTCH and the DCCH. Still further, the measuring component 41 may optionally be configured to measure the energy of the Dedicated Physical Control Channel (DPCCH).

Specifically, the measuring component 41 may be configured to measure the energy of first path metric and a second path metric. The energy of the first path metric and the second path metric are the energies of the strongest and second strongest transmission paths tracked by the Viterbi algorithm. In other words, the measuring component 41 may be configured to measure the first path metric output and the second path metric output from the Viterbi algorithm. As alluded to earlier, the ratio of the strongest to the second strongest path at the time that DTCH is decoded is compared to a threshold for determination of the existence of DCCH.

Figure 3:
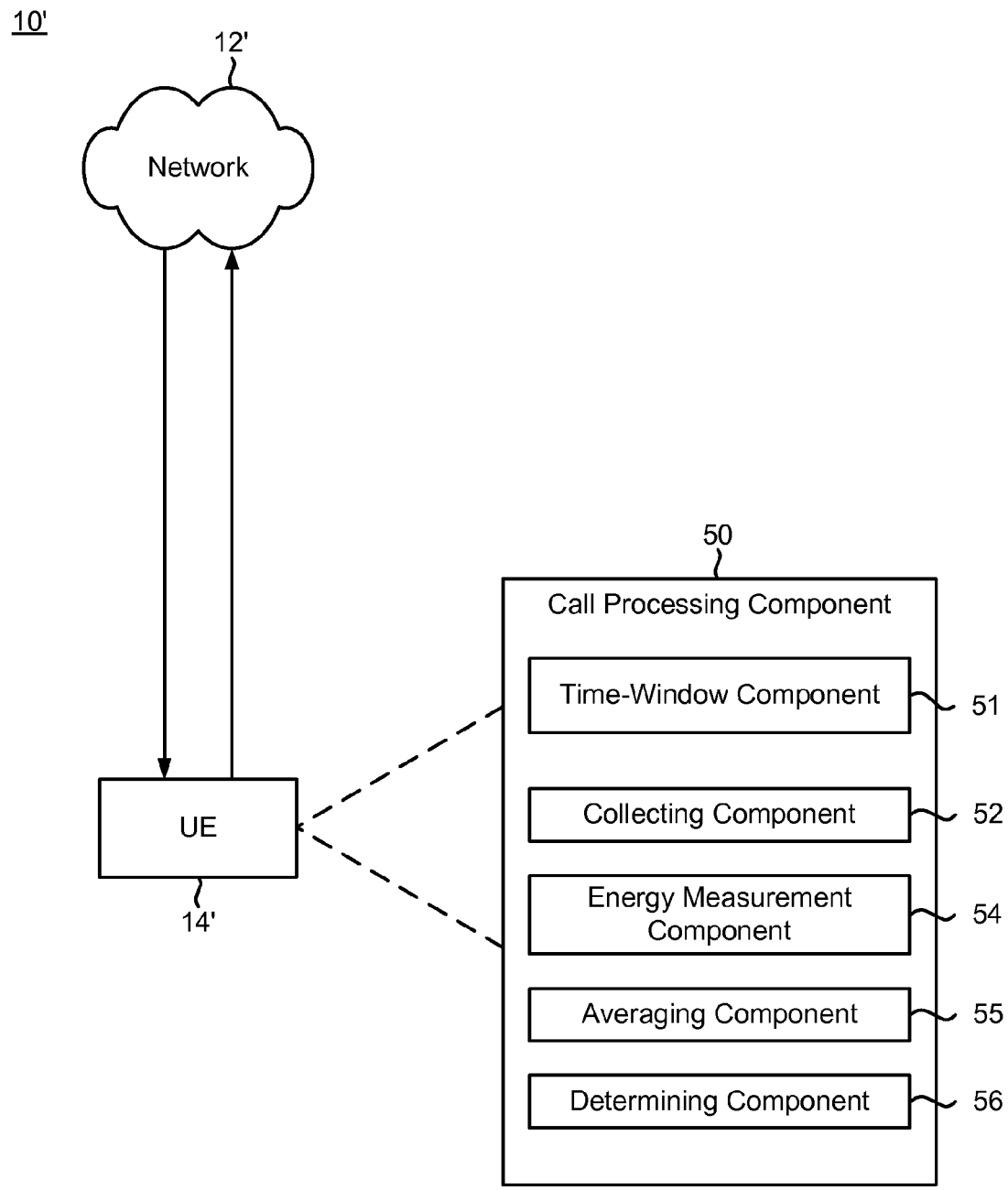
FIG. 3 discloses another embodiment of processing calls in a wireless communication system.

FIG. 3 discloses another embodiment of this invention where a wireless communication system 10' is configured to include wireless communications between wireless network 12' and UE 14'. Analogous to FIG. 1, wireless communication system 10' is configured to include wireless communications between wireless network 12' and UE 14'. The wireless communication system 10' may be configured to support communications between a number of users and can be configured for downlink message transmission or uplink message transmission.

Within the UE 14' resides a call processing component 50 that may be configured to include a time-window component 51. The call processing component 50 may choose an appropriate energy measurement time-window which is configured to align with the time instant that the power control gain changes. In other words, the energy measurement time-window is the duration after which the DTCH transmission packet is decoded. In addition, call processing component 50 may be configured to include an establishing component 52 configured to establish Set A corresponds to DCCH positions (or symbols?), Set B composed of DTCH and DPCCH symbols, and Set C composed of a scaled average of Set B.

Call processing component 50 is also configured to include an energy measurement component 54. The energy measurement component 54 may be configured to apply an energy measurement function (discussed below) to each element of set A and apply the energy measurement function to each element of set C.

Afterwards, averaging component 55 averages the results from applying the energy measurement function to each element of Set A and Set C. Last, a determining component 56, residing in call processing component 50, is configured to determine if DCCH is present when a ratio of averaged energies of Set A to Set C exceeds a predetermined threshold.

Figure 4:
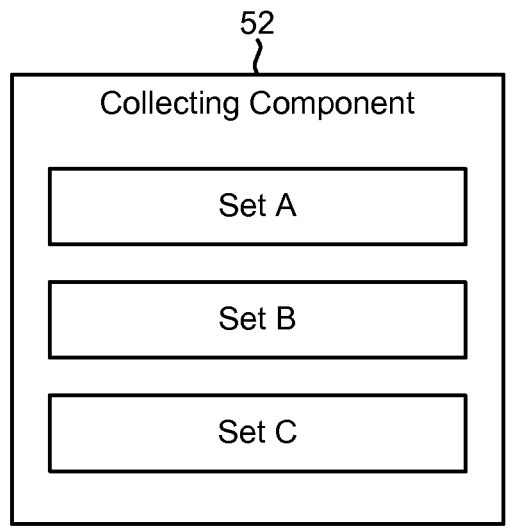
FIG. 4 is a schematic diagram further illustrating the functionality and operation of the establishing component residing in a wireless communication system.

FIG. 4 is a schematic diagram further illustrating the functionality and operation of the establishing component 52 that resides in the call processing component 50 (FIG. 3).

Establishing component 52 is capable of establish Set A, Set B, and Set C. Specifically, Set A is composed of received BPSK symbols corresponding to DCCH positions in the energy measurement time-window. Set B is composed of the received subset of Dedicated Transport Channel (DTCH) and subset of Dedicated Physical Control Channel (DPCCH) symbols in the energy measurement time-window.

Finally, Set C is established by scaling and averaging the subsets of Set B. The scaling of the symbols of subsets of Set B consists of scaling the DPCCH symbols to undo the effect of a known transmit power offset between DPCCH symbols and the DTCH symbols, and scaling the DPCCH pilot symbols by a known transmit pilot bit pattern. Moreover, the averaging of the scaled symbols of the subsets of Set B consists of averaging groups of DPCCH pilots that were transmitted near to each other in time.

After establishing Set A, B, and C, the call processing component 50 continues on with the processing by the energy measurement component 54, the averaging component 55, and the determining component 56 of FIG. 3.

The above approach in verifying the existence of DCCH transmission packet requires the utilization of the energy of the received DPCCH transmission bits as a reference parameter instead of simply noise. Note, DPCCH transmission bits can be subject to the same processing as the DCCH transmission packet in the receiver's demodulator.

Since WCDMA R99 channels are transmitted with Quadrature Phase Shift Keying (QPSK) modulation and of the two bits carried in each modulation symbol, it is possible that 0, 1, or 2 are used to carry DCCH transmission. As a result, the received QPSK symbols must be demultiplexed into their two component BPSK symbols (on the real and imaginary branches) and if DCCH transmission exists on the R99 channel, only the energies of the BPSK symbols corresponding to DCCH need to be averaged.

Moreover, given that the WCDMA R99 channels are also power-controlled, the DCCH and DPCCH are time-division multiplexed. Since the power-control gain could change in the middle of a slot, the DCCH and DPCCH pilots within one slot may have different transmit powers. To enable a fair comparison between the DCCH and DPCCH pilot energies, the time-window over which these energies are measured should be configure to align with the time instant at which the power control gain changes.

Since the detector (call processing) performance may suffer because of insufficient number of observations of DPCCH symbols to reliably measure their energy, the BPSK symbols corresponding to DTCH could also be included. Namely, to improve performance, the BPSK symbols corresponding to DTCH could also be included together with the DPCCH symbols to make up the set of reference symbols whose energy is compared with that of DCCH to detect presence of DCCH. The DTCH positions will be known exactly once DTCH has been successfully decoded.

Additionally, the DCCH and DTCH transmission packets could be sent at a power level which is offset from that of the DPCCH. When DTCH bits are used along with DPCCH as the detector reference signal, this power offset must be accounted for when measuring the reference signal energy. The offset must also be accounted for when comparing the DCCH energy to the reference signal energy. The offset is signaled by the Node-B to the UE, and can thus be assumed to be known at the UE. The UE's DCCH detection thresholds can be made a function of this power offset, since the detection performance will depend on the power offset.

However, some networks may possibly signal incorrect values of the DCCH/DPCCH power offset to the UEs, especially if no other aspect of the system operation is critically dependent on correct knowledge of this power offset. An incorrect power offset value will have a big impact on the proposed DCCH detection scheme. This is because the detection threshold used is correspondingly offset from its correct value, causing probabilities of missing and falsely detecting DCCH transmission to be different from their intended values.

This issue could be resolved by a combination of the following approaches: (a) Initially choose a lower detection threshold to minimize the risk of missing DCCH, monitor the resulting (higher than intended) false DCCH detection probability, and compare with its expected value for that threshold to try and identify a possibly incorrect value of the ratio of the transmit powers of the DPCCH pilot symbols and the DPCCH symbols, and (b) Periodically estimate the power offset at the UE as the ratio of received DTCH energy to DPCCH pilot energy, and compare this estimate with the signaled power offset value.

The DCCH detection algorithm described above can be summarized by the following equation:

Declare DCCH present if, and only if, $$\frac{1}{N}\sum_{i=1}^{N} f(d_i) \geq T(PO, \text{decode time}) * \frac{1}{M}\sum_{j=1}^{M} f(r_j)$$

Here $d_i, r_j$ are respectively the DCCH and reference signal symbols within the energy measurement window. This window is the time duration for which the DTCH packet was received prior to being successfully decoded, or possibly a subset of this duration.

The reference signal symbols $r_j$ could be some subset of the set of scaled DPCCH symbols (pilots, TPC and TFCI) and DTCH symbols, where the scaling applied on the DPCCH symbols is intended to undo the effect of the known transmit offset between the power of these symbols and that of DTCH and DCCH.

The reference signal symbols $r_j$ could also be created from this subset by averaging (coherent combining) of groups of elements of this subset. For example, the DPCCH pilot bit values are known to the receiver.

Hence, all symbols within the measurement window corresponding to these bits can be averaged after uncovering the transmit modulation corresponding to these bit values, to create a single symbol $r_j$. If the measurement window is too large, the averaging can be done separately over groups of these symbols that are transmitted close to each other in time, to minimize the effects of changes in the propagation channel from symbol to symbol.

The function $f$ represents the energy measurement function, eg. $f(x)=|x|^2$ to use the classical (L2-norm) energy, or $f(x)=|x|$ to represent hard decisions on the BPSK symbols followed by coherent combining based on those hard decisions.

The parameter T(PO,decode time) is the detection threshold, which is a function of the DPCCH to DCCH power offset PO as well as decode time, the length of the time duration for which the packet was received prior to successful decoding of DTCH. Further, this parameter could also be varied or adapted depending on current state of the receiver. For example, at the start of the connection, a smaller value could be used, which could then be gradually increased to the steady state value, in order to be conservative in meeting the requirement on DCCH miss probability while the UE validates the value of PO that was signaled to it by the Node-B.

Similarly, the threshold could also be adapted based on the outer-loop SNR target. For example, increase in this target suggests that the UE is experiencing performance issues with DTCH decoding, and the threshold could be lowered in such situations to be conservative in meeting the miss probability requirement.

Figure 5:
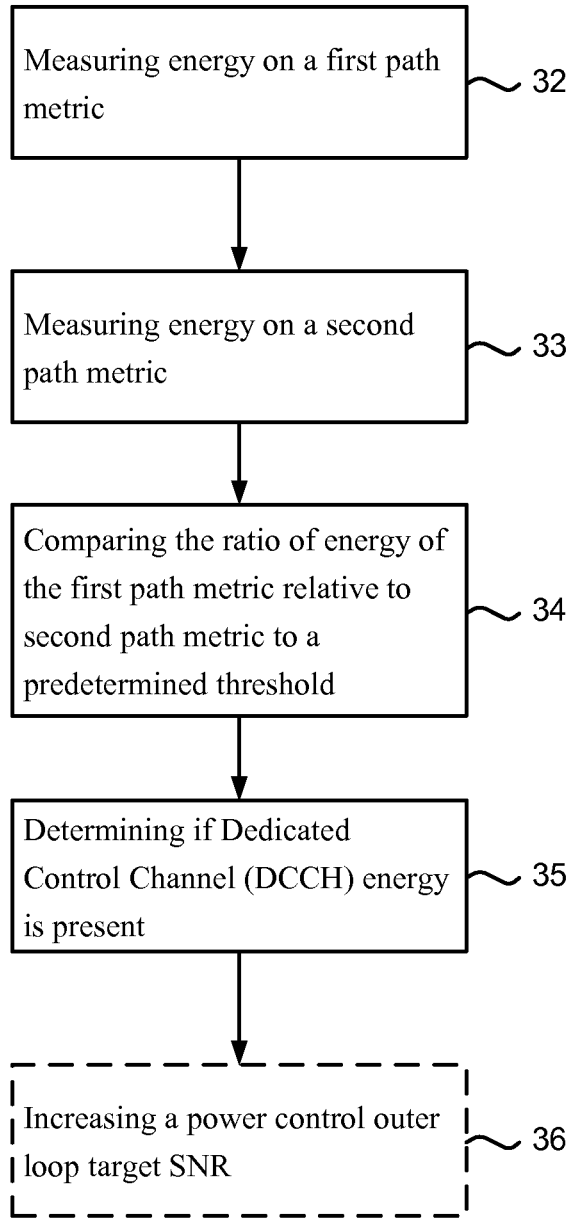
FIG. 5 is a flow diagram illustrating one aspect of a method of processing calls in a wireless communication system.

FIG. 5 is a flow diagram illustrating one aspect of a method 30. At 32, the UE measures the energy on a first path metric. At 33, the UE measures the energy on a second path metric. Comparing the ratio of energy of the first path metric relative to second path metric to a predetermined threshold occurs at 34. Afterwards, at step 35 a determination is made if DCCH energy is present depending on if the ratio of energy is higher than the predetermined threshold. Last, at 36 the UE optionally increases the power control outer loop target SNR if DCCH energy is present. In an aspect, for example, the UE executing method 30 may be UE 14 (FIG. 1) executing the call processing component 40 (FIG. 1), or respective components thereof.

Figure 6:
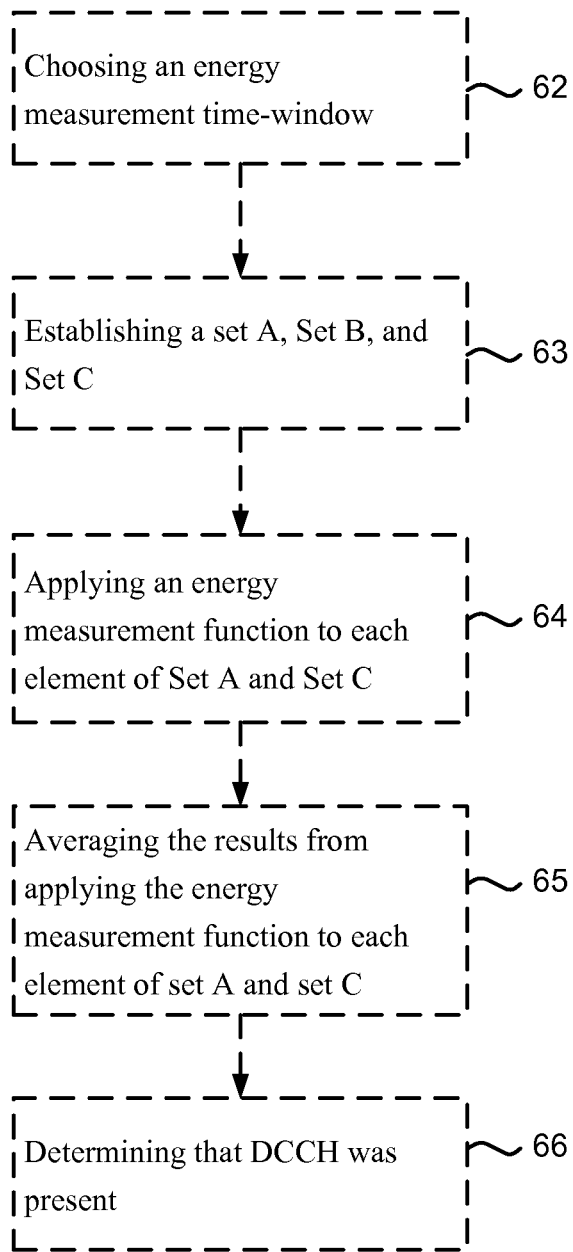
FIG. 6 is a flow diagram illustrating another aspect of a method of processing calls in a wireless communication system.

FIG. 6 is a flow diagram illustrating one aspect of a method 60. At 62, the UE chooses an energy measurement time-window. At step 63, and 64, the UE establishes a Set A composed of received BPSK symbols corresponding to DCCH positions in the energy measurement time-window and establishes a Set B composed of received Dedicated Transport Channel (DTCH) and Dedicated Physical Control Channel (DPCCH) symbols in the energy measurement time-window. Establishing a Set C by scaling and averaging Set B occurs at step 65. At 66, the UE applys an energy measurement function to each element of set A and applying an energy measurement function to each element of Set C. Averaging the results from applying the energy measurement function to each element of set A and set C occurs at step 67. Last, at 68, the UE determines that a DCCH was present if a ratio of average energies of Set A to Set C exceeds a predetermined threshold. In an aspect, for example, the UE executing method 60 may be UE 14' (FIG. 3) executing the call processing component 40' (FIG. 3), or respective components thereof.

Although the above algorithms have been presented in the framework of DCCH detection for the sake of concreteness, the algorithms are actually more general. The algorithm using the two best path metrics from the Viterbi decoder can be used on the decoder for any specific transport format on any specific transport channel, to give an indication of the likelihood that that transport format was actually transmitted at any given time. The algorithm using the symbol energy measurement applies to the detection problem of deciding whether or not a given transmission contains one of a specific subset of the possible transport formats allowed on a specific transport channel. The subset must have the property that it results in symbol positions that will be modulated only if a transport format from that subset is being transmitted, and will be DTXed otherwise. Then those symbol positions serve the purpose of the DCCH symbol positions in the previous algorithm description. The symbol positions corresponding to any other concurrently transmitted transport blocks that have already been decoded can be used together with the DPCCH symbols to serve as the reference signal for the detector's energy comparison. Further, this algorithm can then be used iteratively by first narrowing down the possible transport format hypotheses to a subset of the originally possible ones, and then reusing the same algorithm on that subset.

As an application, R99 voice using the AMR codec has 3 different packet types—Full, silence interval descriptor (SID), and Null. The Full packet occupies significantly more modulation symbol positions than SID and Null, and also requires more transmit power to meet its desired BLER. The generalized detection algorithm described above can be applied to detect the presence of the Full packet even before it can be decoded, and then raise the outer-loop SNR target from the instant of this detection until the packet has decoded. This improves the decoding performance of the Full packet. The same detection can be repeated possibly using a lower threshold, to examine whether the receiver can conclude that the probability of a Full packet transmission is very low. In this case, the receiver concludes that the transmitted packet is either SID or Null, and repeats the algorithm to distinguish between these two. Since the SID packet requires slightly higher power than the Null packet, although not as much as the Full packet, a smaller increase of the outer-loop SNR target can be performed if the detector detects presence of the SID packet.

Similarly, in networks where DCCH transport formats (TFs) are 1x0 and 1xN instead of 0xN and 1xN (where N=TBS used for transmitted DCCH packets), certain symbols are transmitted on DCCH with nonzero power even in the TTIs when there is no real DCCH packet data to be sent. The positions of the symbols transmitted during 1x0 are pre-computed and excluded in the DCCH energy measurement. Another way to achieve this is to continue to include those symbols (i.e., follow the same procedure as used when the DCCH TFs are 0xN and 1xN), but adjust the thresholds to account for the energy sent on the 1x0 packet.

Additional aspects include the ability to temporarily increase the SNR target. This temporary increase of the SNR could be available for the duration of the DCCH TTI.

Figure 7:
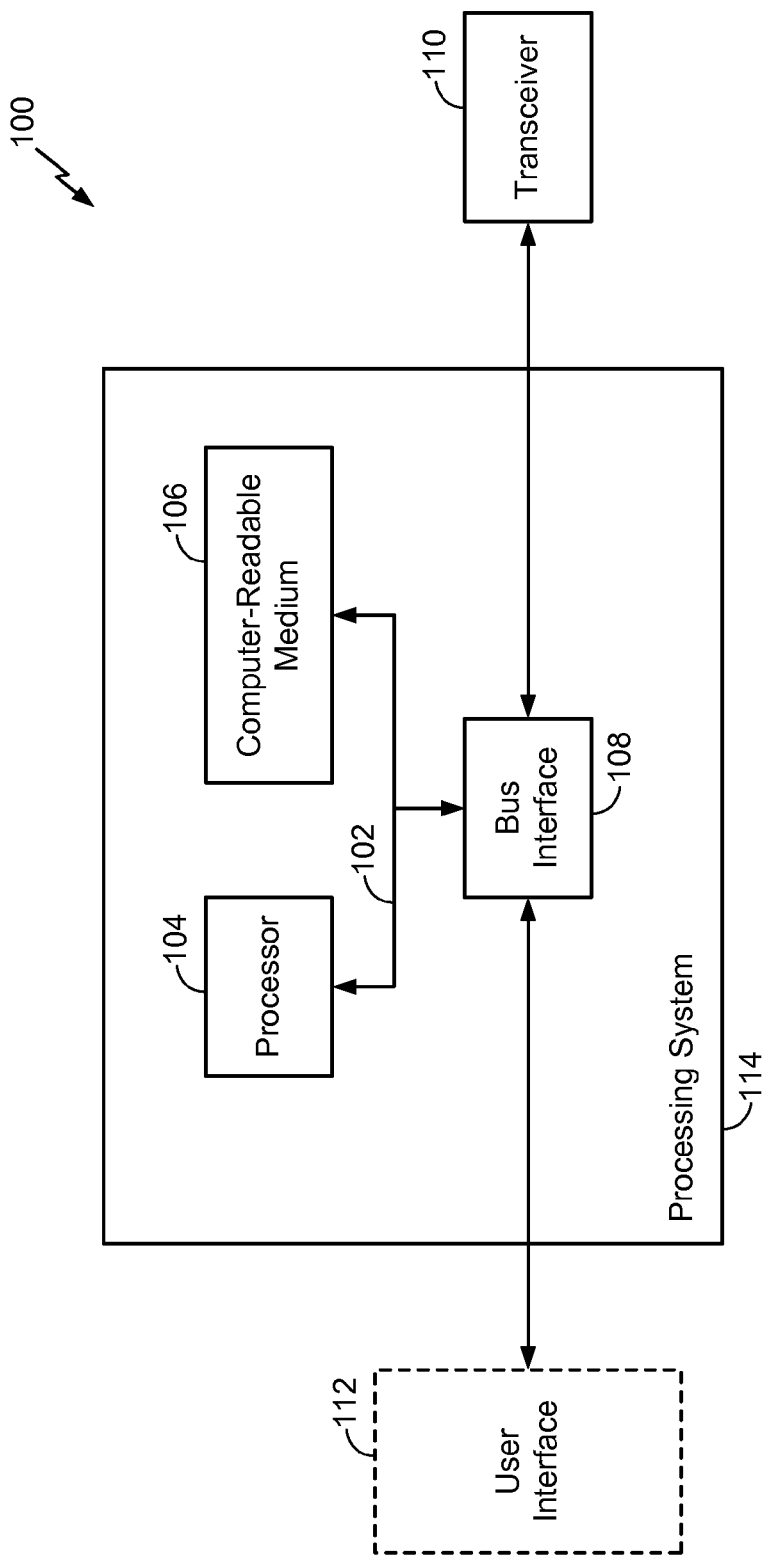
FIG. 7 is a block diagram illustrating an example of a hardware implementation for an apparatus employing a processing system to perform the functions described herein.

FIG. 7 is a block diagram illustrating an example of a hardware implementation for an apparatus 100 employing a processing system 114 for performing the processing and decoding of data, as described herein. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

In an aspect, processor 104, computer-readable medium 106, or a combination of both may be configured or otherwise specially programmed to perform the functionality of the call processing component 40 (FIG. 1) or call processing component 50 (FIG. 3) configured for improving the power consumption of a UE upon detection of a DCCH transmission packet.

The various concepts presented throughout this disclosure may be implemented across a broad variety of telecommunication systems, network architectures, and communication standards.

Figure 8:
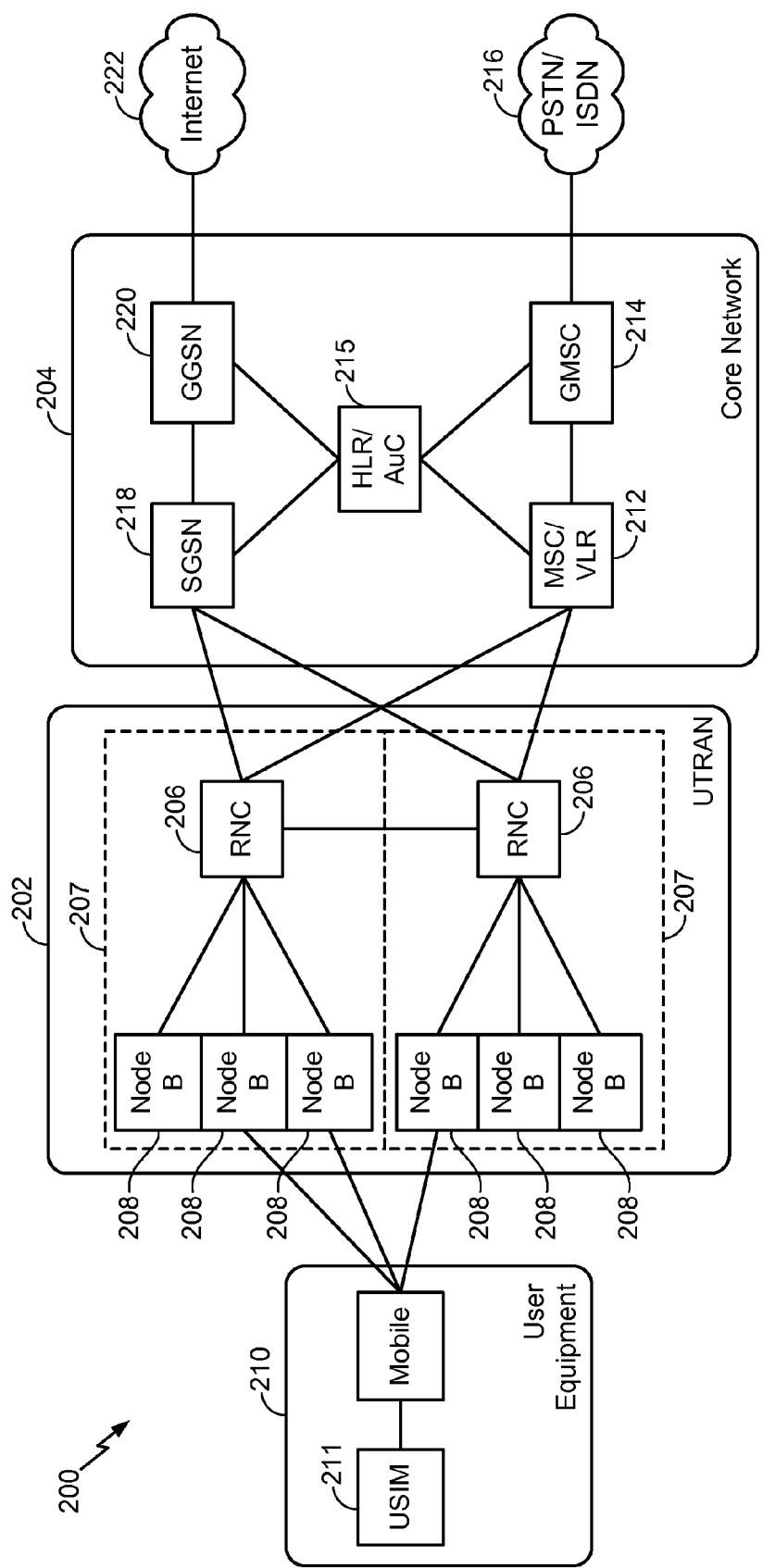
FIG. 8 is a block diagram conceptually illustrating an example of a telecommunications system including a UE configured to perform the functions described herein.

Referring to FIG. 8, by way of example and without limitation, the aspects of the present disclosure are presented with reference to a UMTS system 200 employing a W-CDMA air interface. A UMTS network includes three interacting domains: a Core Network (CN) 204, a UMTS Terrestrial Radio Access Network (UTRAN) 202, and User Equipment (UE) 210. UE 210 may be configured to include, for example, the call processing component 40 (FIG. 1) or call processing component 50 (FIG. 3) configured for improving the power consumption of a UE upon detection of a DCCH transmission packet. In this example, the UTRAN 202 provides various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between a UE 210 and a Node B 208 may be considered as including a physical (PHY) layer and a medium access control (MAC) layer. Further, communication between a UE 210 and an RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information herein below utilizes terminology introduced in the RRC Protocol Specification, 3GPP TS 25.331, incorporated herein by reference.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function an access point (AP), or some other suitable terminology. For clarity, three Node Bs 208 are shown in each RNS 207; however, the RNSs 207 may include any number of wireless Node Bs. The Node Bs 208 provide wireless access points to a CN 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The DL, also called the forward link, refers to the communication link from a Node B 208 to a UE 210, and the UL, also called the reverse link, refers to the communication link from a UE 210 to a Node B 208.

The CN 204 interfaces with one or more access networks, such as the UTRAN 202. As shown, the CN 204 is a GSM core network. However, as those skilled in the art will recognize, the various concepts presented throughout this disclosure may be implemented in a RAN, or other suitable access network, to provide UEs with access to types of CNs other than GSM networks.

The CN 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a VLR that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The CN 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 210 provides feedback to the node B 208 over the HS-DPCCH to indicate whether it correctly decoded a packet on the downlink.

HS-DPCCH further includes feedback signaling from the UE 210 to assist the node B 208 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 208 and/or the UE 210 may have multiple antennas supporting MIMO technology. The use of MIMO technology enables the node B 208 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data streams may be transmitted to a single UE 210 to increase the data rate, or to multiple UEs 210 to increase the overall system capacity. This is achieved by spatially precoding each data stream and then transmitting each spatially precoded stream through a different transmit antenna on the downlink. The spatially precoded data streams arrive at the UE(s) 210 with different spatial signatures, which enables each of the UE(s) 210 to recover the one or more of the data streams destined for that UE 210. On the uplink, each UE 210 may transmit one or more spatially precoded data streams, which enables the node B 208 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 9:
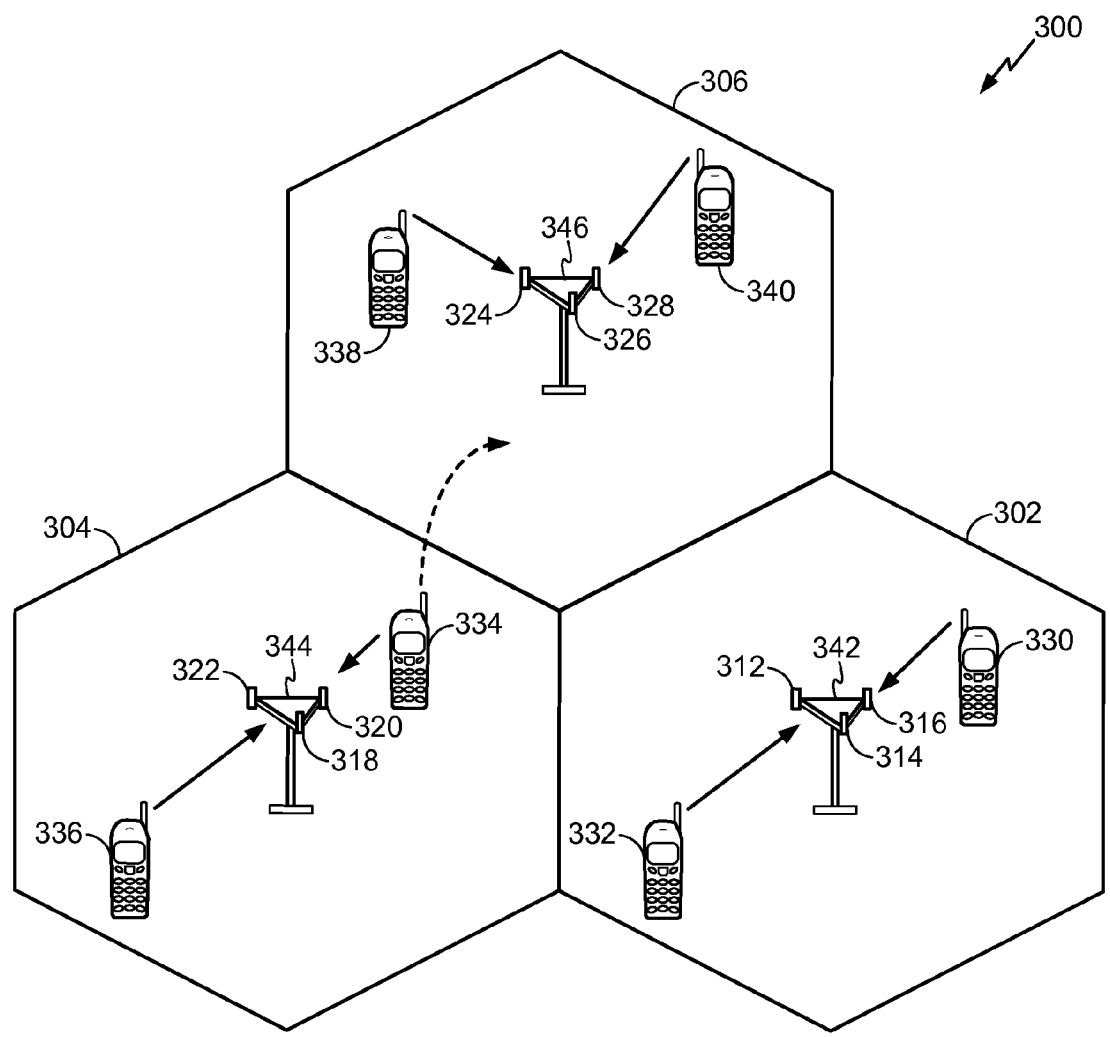
FIG. 9 is a conceptual diagram illustrating an example of an access network for use with a UE configured to perform the functions described herein.

Referring to FIG. 9, an access network 300 in a UTRAN architecture is illustrated. The multiple access wireless communication system includes multiple cellular regions (cells), including cells 302, 304, and 306, each of which may include one or more sectors. The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., User Equipment or UEs, which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a CN 204 (see FIG. 5) for all the UEs 330, 332, 334, 336, 338, 340 in the respective cells 302, 304, and 306. Node Bs 342, 344, 346 and UEs 330, 332, 334, 336, 338, 340 respectively may be configured to include, for example, the call processing component 40 (FIG. 1) or call processing component 50 (FIG. 3) configured for improving the power consumption of a UE upon detection of a DCCH transmission packet.

As the UE 334 moves from the illustrated location in cell 304 into cell 306, a serving cell change (SCC) or handover may occur in which communication with the UE 334 transitions from the cell 304, which may be referred to as the source cell, to cell 306, which may be referred to as the target cell. Management of the handover procedure may take place at the UE 334, at the Node Bs corresponding to the respective cells, at a radio network controller 206 (see FIG. 8), or at another suitable node in the wireless network. For example, during a call with the source cell 304, or at any other time, the UE 334 may monitor various parameters of the source cell 304 as well as various parameters of neighboring cells such as cells 306 and 302. Further, depending on the quality of these parameters, the UE 334 may maintain communication with one or more of the neighboring cells. During this time, the UE 334 may maintain an Active Set, that is, a list of cells that the UE 334 is simultaneously connected to (i.e., the UTRA cells that are currently assigning a downlink dedicated physical channel DPCH or fractional downlink dedicated physical channel F-DPCH to the UE 334 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 10.

Figure 10:
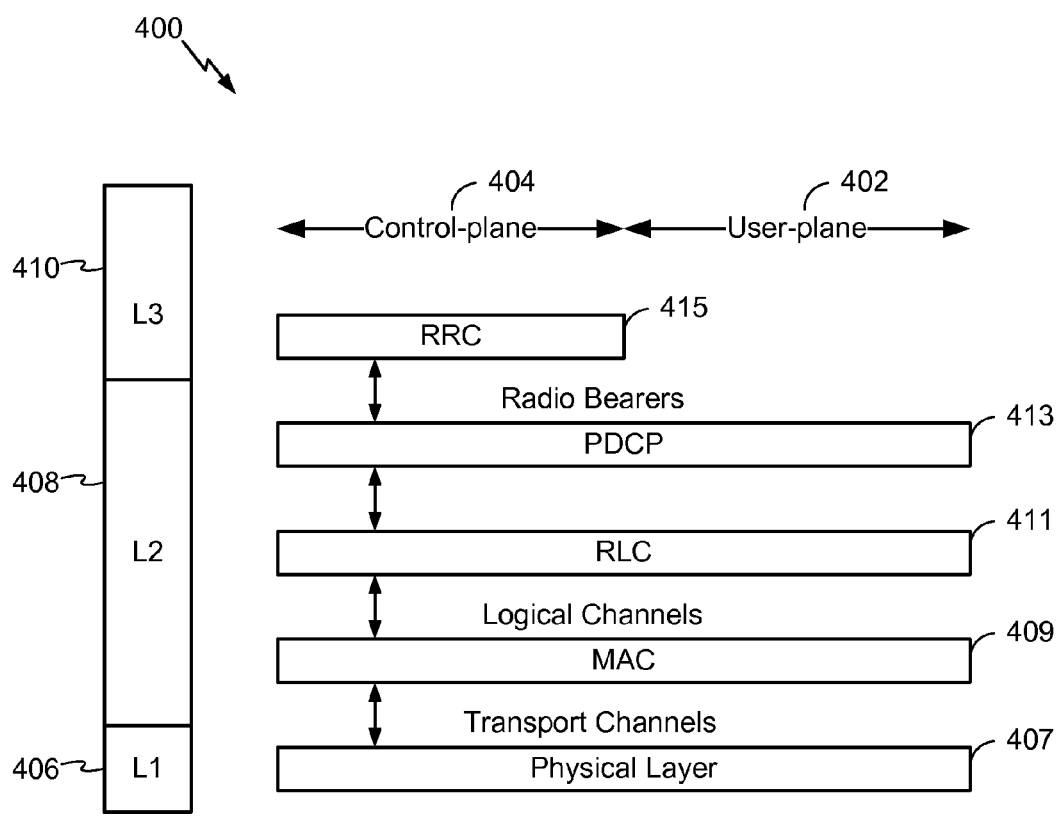
FIG. 10 is a conceptual diagram illustrating an example of a radio protocol architecture for the user and control planes for a base station and/or a UE configured to perform the functions described herein.

FIG. 10 is a conceptual diagram illustrating an example of the radio protocol architecture 400 for the user plane 402 and the control plane 404 of a user equipment (UE) or node B/base station. For example, architecture 400 may be included in a network entity and/or UE such as an entity within wireless network 12 and/or UE 14 (FIG. 1) or wireless network 12' and/or UE 14' (FIG. 3). The radio protocol architecture 400 for the UE and node B is shown with three layers: Layer 1 406, Layer 2 408, and Layer 3 410. Layer 1 406 is the lowest layer and implements various physical layer signal processing functions. As such, Layer 1 406 includes the physical layer 407. Layer 2 (L2 layer) 408 is above the physical layer 407 and is responsible for the link between the UE and node B over the physical layer 407. Layer 3 (L3 layer) 410 includes a radio resource control (RRC) sublayer 415. The RRC sublayer 415 handles the control plane signaling of Layer 3 between the UE and the UTRAN.

In the user plane, the L2 layer 408 includes a media access control (MAC) sublayer 409, a radio link control (RLC) sublayer 411, and a packet data convergence protocol (PDCP) 413 sublayer, which are terminated at the node B on the network side. Although not shown, the UE may have several upper layers above the L2 layer 408 including a network layer (e.g., IP layer) that is terminated at a PDN gateway on the network side, and an application layer that is terminated at the other end of the connection (e.g., far end UE, server, etc.).

The PDCP sublayer 413 provides multiplexing between different radio bearers and logical channels. The PDCP sublayer 413 also provides header compression for upper layer data packets to reduce radio transmission overhead, security by ciphering the data packets, and handover support for UEs between node Bs. The RLC sublayer 411 provides segmentation and reassembly of upper layer data packets, retransmission of lost data packets, and reordering of data packets to compensate for out-of-order reception due to hybrid automatic repeat request (HARQ). The MAC sublayer 409 provides multiplexing between logical and transport channels. The MAC sublayer 409 is also responsible for allocating the various radio resources (e.g., resource blocks) in one cell among the UEs. The MAC sublayer 409 is also responsible for HARQ operations.

Figure 11:
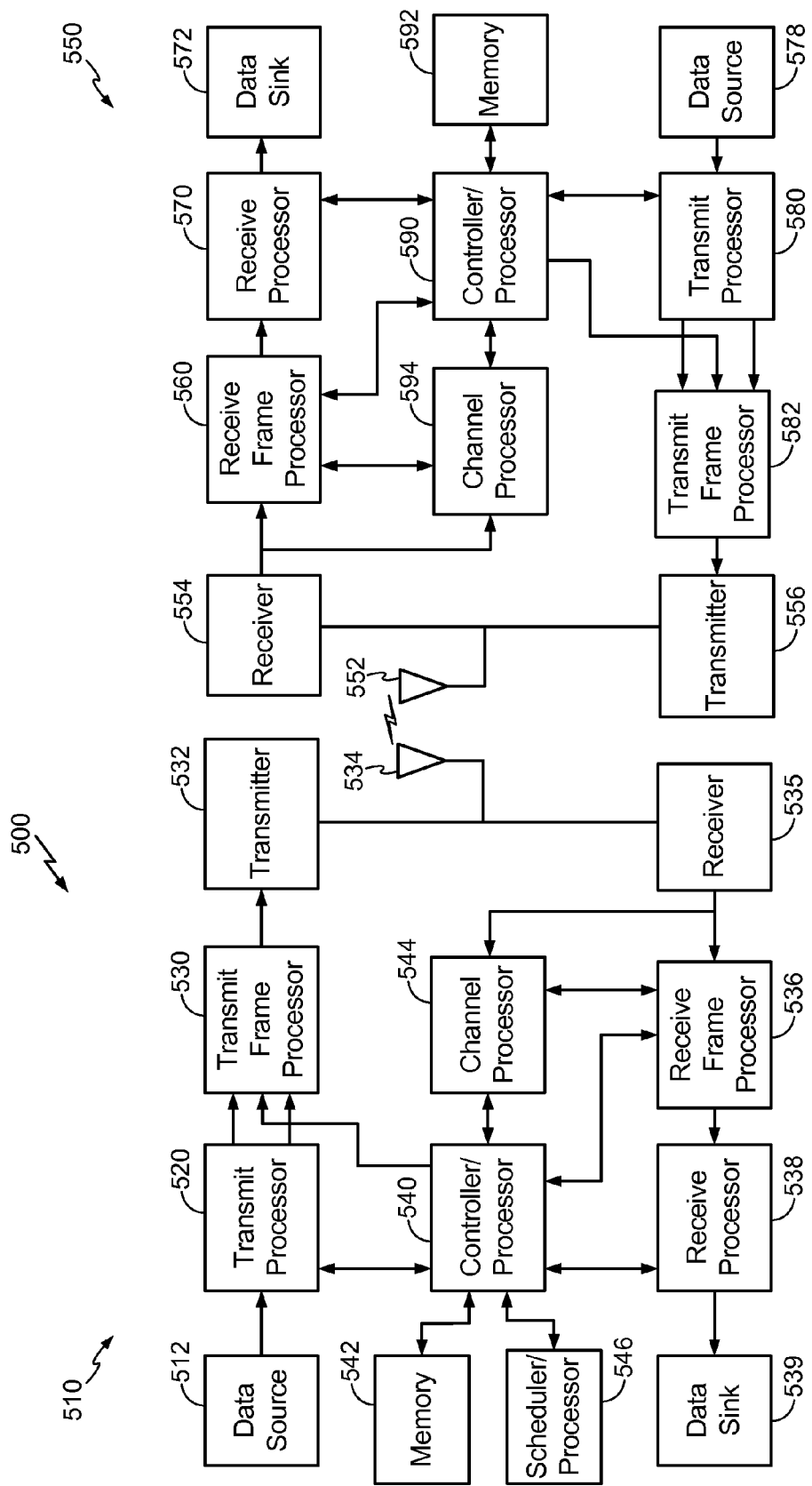
FIG. 11 is a block diagram conceptually illustrating an example of a Node B in communication with a UE in a telecommunications system configured to perform the functions described herein.

FIG. 11 is a block diagram of a communication system 500 including a Node B 510 in communication with a UE 550, where Node B 510 may be an entity within wireless network 12 and the UE 550 may be UE 14 according to the aspect described in FIG. 1 or UE 14' described in FIG. 3. In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

FIG. 9 is a conceptual diagram illustrating an example of UMTS network architecture in a wireless communication system. Data network 600 may be configured to communicate with UMTS Core Network 610 which in turn communicates with the Flexible (Fr) UTRAN 620, UTRAN 630, GSM EDGE Radio Access Network (GERAN) 640, and public switched telephone network (PSTN) 650. The UMTS Core Network 610 may be configured to include a Gateway General Support Node (GGSN), a Home Location Register (HLR), a Serving GPRS Support Node (SGSN), and a Mobile Switching Center/Visitor Location Register (MSC/VLR).

Fr-UTRAN 620 includes a flexible UE (Fr UE), Radio Network Controls (RNCs) and a Node B. Similarly, UTRAN 630 includes a UE, RNCs and a Node B. Communication between the UMTS Core Network 610, Fr-UTRAN 620, and UTRAN 630 may occur either in Packet Switched (PS) mode or CS mode. Last, within GERAN 640 reside a Base Station Controller (BSC), a Base Station (BTS), and a mobile station (MS).

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   measuring energy on a first path metric of a strongest path tracked by a Viterbi decoder algorithm;
   measuring energy on a second path metric of a second strongest path tracked by the Viterbi decoder algorithm;
   comparing a ratio of energy of the first path metric and the second path metric to a predetermined threshold; and
   determining if Dedicated Control Channel (DCCH) energy is present when the ratio of energy is higher than the predetermined threshold,
   wherein the ratio of energy of the first path metric and the second path metric is at a time that a dedicated transport channel (DTCH) is decoded.

2. The method of claim 1, further comprising:
   increasing a power control outer loop target signal to noise ratio (SNR) when DCCH is detected.

3. The method of claim 2, wherein the increasing the power control output target SNR occurs early in a network transmission to a user equipment.

4. The method of claim 1, wherein the predetermined threshold is adjustable based on miss probability requirements.

5. An apparatus for wireless communication, comprising:
   at least one processor; and
   a memory coupled to the at least one processor, wherein the at least one processor is configured to:
   measure energy on a first path metric of a strongest path tracked by a Viterbi decoder algorithm;
   measure energy on a second path metric of a second strongest path tracked by the Viterbi decoder algorithm;
   compare a ratio of energy of the first path metric and the second path metric to a predetermined threshold; and
   determine if DCCH energy is present when the ratio of energy is higher than the predetermined threshold,
   wherein the ratio of energy of the first path metric and the second path metric is at a time that a dedicated transport channel (DTCH) is decoded.

6. The apparatus of claim 5, further configured to:
   increase a power control outer loop target signal to noise ratio (SNR) when DCCH is detected.

7. The apparatus of claim 6, wherein the increase of the power control output target SNR occurs early in a network transmission to a user equipment.

8. The apparatus of claim 5, wherein the predetermined threshold is adjustable based on miss probability requirements.

9. An apparatus for wireless communication, comprising:
   means for measuring energy on a first path metric of a strongest path tracked by a Viterbi decoder algorithm;
   means for measuring energy on a second path metric of a second strongest path tracked by the Viterbi decoder algorithm;
   means for comparing a ratio of energy of the first path metric and the second path metric to a predetermined threshold; and
   means for determining if DCCH energy is present when the ratio of energy is higher than the predetermined threshold,
   wherein the ratio of energy of the first path metric and the second path metric is at a time that a dedicated transport channel (DTCH) is decoded.

10. A computer program product, comprising:
    a non-transitory computer readable medium comprising code executable by a computer, including code for:
    measuring energy on a first path metric of a strongest path tracked by a Viterbi decoder algorithm;
    measuring energy on a second path metric of a second strongest path tracked by the Viterbi decoder algorithm;
    comparing a ratio of energy of the first path metric and the second path metric to a predetermined threshold; and
    determining if DCCH energy is present when the ratio of energy is higher than the predetermined threshold,
    wherein the ratio of energy of the first path metric and the second path metric is at a time that a dedicated transport channel (DTCH) is decoded.

* * * * *